United States Patent Office 2,715,635
Patented Aug. 16, 1955

2,715,635
PROCESS OF MAKING CYCLIC MONOMERIC DISULFIDES

Franklin O. Davis, Trenton, N. J., assignor, by mesne assignments, to Thiokol Chemical Corporation, Trenton, N. J., a corporation of Delaware No Drawing. Original application August 2, 1952, Serial No. 240,067, now Patent No. 2,657,198, dated October 27, 1953. Divided and this application February 6, 1953, Serial No. 335,597

2 Claims. (Cl. 260—327)

This invention relates to new cyclic compounds having a disulfide linkage, the polymerization thereof to produce polymers useful as plastic compounds, protective coatings, casting materials and the like and methods of making said ring compounds.

There are numerous references in the literature to heterocyclic sulfur compounds containing one or several monosulfide groups. There are, on the other hand, no thoroughly substantiated cases of simple heterocyclics containing disulfide groups in the rings and no indications of the novel properties of such heterocyclic compounds.

There are many advantages in substances which without the necessity of solvents or dispersion media can be made, stored, and transported in the form of a liquid and which can be converted when desired from the liquid condition into a high polymer having rubbery or other useful characteristics. It is further advantageous when such liquids can be so converted by a process of true polymerization, as distinguished from condensation, because then the polymerization can be effected without the large change in volume and density which accompanies condensation reactions. Such physical changes are frequently accompanied by cracks and other flaws in the resultant casting. A liquid having the above-mentioned characteristics is a useful casting compound because it can be poured into a mold, will readily fill the spaces and interstices therein and can then, without large shrinkage, be converted into a solid molded product having rubbery or other useful characteristics.

The outstanding properties of the polysulfide polymers in respect to solvent resistance are well known and their usefulness for many applications is unquestionably valuable. The desirability and usefulness of such polymers when obtained from liquids is clearly demonstrated by the various liquid polysulfide polymers now available. These liquid polymers while advantageous in many respects, still require curatives generally in stoichiometric or larger amounts in order to be converted into a polymer by oxidation of thiol to disulfide groups. The low molecular weight liquids of this invention, on the other hand, are converted to solid rubbery or plastic polymers by use of only small, catalytic quantities, of converting materials. It is thus obvious that these materials possess many advantages not present in the line of liquid polymers, now available, which are capable of conversion to the polysulfide polymers. Previous to the mercaptan liquid polymers the only way of obtaining these polymers was by the reaction of halide and polysulfide resulting in an aqueous latex or suspension, offering numerous disadvantages in many instances. The liquid compounds of this invention present advantages over the thiol terminated liquid polymers in that they are much less viscous and are nevertheless capable of converting readily to a high polymer. They are, in fact, the only true monomers of the polysulfide type of polymer.

Generically the invention comprises new compositions of mater responding to the generic formula

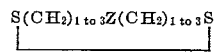

their production and polymerization. The general formula of a preferred class of said cyclic disulfides is

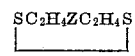

Z is a member of the group consisting of —O—, —S—, —OCH₂O—, —SCH₂S—, —OC₂H₄O—, —SC₂H₄S—, and —CH₂—.

In accordance with the invention the monomeric ring compounds of the invention are polymerized by treatment with a catalyst. The polymerization of these disulfide rings is quite surprising and would not be expected from the chemical structure of the compounds. The organic aliphatic disulfides, either monomeric or polymeric, are quite stable compounds.

The present invention provides new compounds responding to the above criteria, methods of polymerizing them and methods for producing them.

In accordance with the invention, monomeric ring compounds are produced and polymerized, examples of such monomeric ring compounds being those having the following structures:

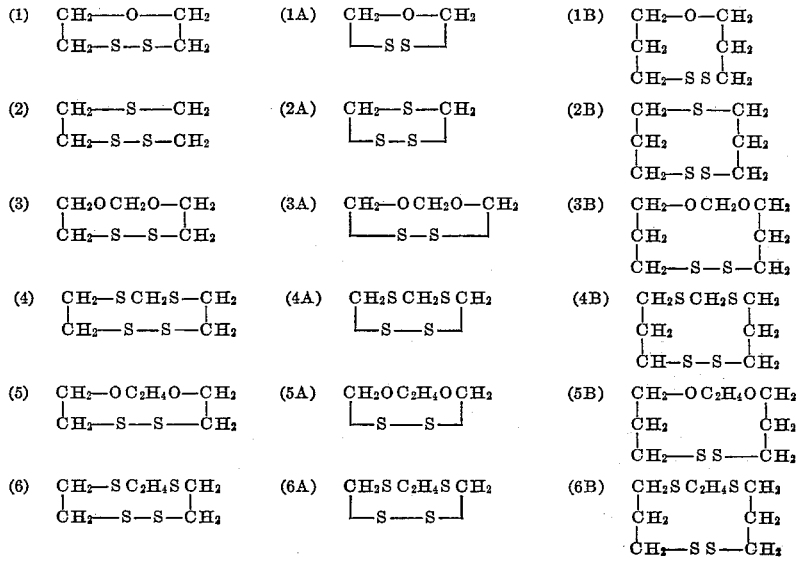

(7) 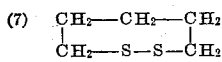  (7A) 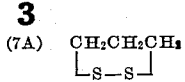  (7B) 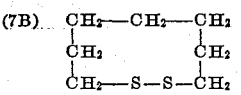

(8) 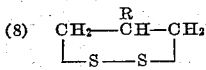

where R is a member of the group consisting of H, CH₃ and OH (9) 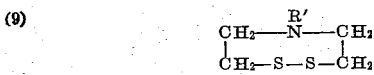

where R' is a member of the group consisting of hydrogen, alkyl, aryl and aralkyl radicals, examples of such radicals being methyl, ethyl, propyl, n-butyl, n-amyl, benzyl and phenyl.

The following examples illustrate the polymerization of such ring compounds.

*Example 1.—Polymerization of Compounds 1, 1A and 1B*

100 cc. of the cyclic dithiodiethyl oxide (Compound 1 above), which is an oil at room temperature, are mixed at room temperature, e. g. 25° C. with 2 cc. of a 25 per cent solution of sodium methylate in methanol and the mixture is poured into a mold. Polymerization begins immediately without heating and in about 24 hours a rubbery polymer is obtained which becomes tough in about 48 hours. Heat is evolved during the reaction, i. e. the reaction is exothermic.

*Example 2.—Polymerization of Compounds 1, 1A and 1B*

Proceed as in Example 1 using 10 cc. of the sodium methylate solution. The polymerization proceeds faster and a tough rubber is obtained within a few minutes.

*Example 3.—Polymerization of Compounds 2, 2A and 2B*

Proceed as in Example 1 using the dithiodiethyl sulfide (Compound No. 2) instead of the dithiodiethyl oxide. A horn-like polymer is obtained. This reaction is much slower than that shown in Example 1.

*Example 4.—Polymerization of Compounds 3, 3A and 3B*

To 100 cc. of the cyclic dithiodiethyl formal (Compound 3 above) are added 5 cc. of water which is stirred in thoroughly to disperse the water in the cyclic formal. Polymerization proceeds spontaneously without the necessity of heating and is completed in about 48 hours. The polymer is a soft rubbery material.

*Example 5.—Polymerization of Compounds 4, 4A and 4B*

Proceed as in Example 4 substituting the cyclic dithiodiethyl thioformal (Compound No. 4) for the dithiodiethyl formal. This reaction is much slower than that with the corresponding oxygen monomer.

*Example 6.—Polymerization of any of the above mentioned cyclic disulfides*

100 cc. of any of the above mentioned cyclic disulfides, e. g. Compound 1 are mixed with 5 cc. of a ten per cent solution of NaSH in absolute ethyl alcohol. Polymerization begins immediately without heating and in about 2 hours a solid high polymer is obtained.

*Example 7.—Polymerization of any of the above mentioned cyclic disulfides*

Proceed as in Example 6 using 5 cc. of a 10 per cent solution of Na₂S in absolute ethyl alcohol as catalyst.

*Example 8.—Polymerization of any of the above mentioned cyclic disulfides*

Proceed as in Example 6 using as catalyst 5 cc. of a 10 per cent solution of Na₂S$_x$ where $x$ is a number (fractional or whole) greater than 1 and not greater than 6.

*Example 9.—Polymerization of any of the above mentioned cyclic disulfides*

Proceed as in Example 6 using as catalyst 5 cc. of a 10 per cent solution of benzyl trimethyl ammonium butoxide in butanol.

*Example 10.—Polymerization of any of the above mentioned cyclic disulfides*

Proceed as in Example 6 using as catalyst 2 cc. of diethylene-triamine.

*Example 11.—Polymerization of Compounds 1, 1A and 1B*

To one liter of water containing ½ mol of Na₂S₄, 10 cc. of a 5 per cent solution of sodium salt of alkyl naphthalene sulfonic acid and a dispersion of magnesium hydroxide prepared by the interaction of 50 cc. of a 50 per cent MgCl₂6H₂O and 50 cc. of a 20 per cent solution of NaOH in water are added. This mixture is heated to 180° F. and there is added slowly 100 grams of Compound 1. This is heated for 30 minutes at 180° F. then the polysulfide solution is washed out and the latex when free of polysulfide is coagulated by acidfication. It gives a polymer closely resembling a polymer prepared in Example A below but not contaminated with thioxane or the other impurities which may be present from the original reaction.

*Example 12.—Polymerization of a mixture of Compounds 1 and 2*

Proceed as in Example 2 using a mixture of 55 cc. of Compound #1 and 50 cc. of Compound #2. In this case a fairly rapid polymerization takes place. The product is a copolymer having rubbery properties which is composed of equimolecular proportions of thioether and ether disulfides. Latices of these types, if mixed, would not give co-polymers unless given a polysulfide treatment.

A variety of catalysts may be used including alkali alcoholates and alkaline sulfides, hydrosulfides and polysulfides, e. g. the sulfides, hydrosulfides and polysulfides of sodium, potassium, ammonium, calcium, barium, etc. Even water alone acts as a catalyst as illustrated by Examples 4 and 5.

Other classes of materials which can be effectively used as catalysts are those of the group consisting of alkyl and aralkyl substituted ammonia compounds and alkyl and aralkyl substituted ammonium compounds. Examples of those compounds are as follows:

1. ALKYL AND ARALKYL SUBSTITUTED AMMONIA COMPOUNDS (AMINES)

H₂NC₂H₄NHC₂H₄NH₂

Diethylene triamine

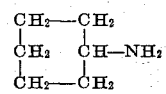

Cyclohexyl amine (HOC₂H₄)₃N

Triethanol amine

H₂NC₂H₄NHC₂H₄NHC₂H₄NH₂

Tetraethylene pentamine

CH₃(HOC₂H₄)₂N

Methyl diethanol amine

C₄H₉(HOC₂H₄)₂N

Butyl diethanol amine

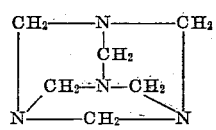

Hexamethylene tetramine

H₂NC₂H₄NH₂

Ethylene diamine

H₂NC₂H₄NHC₂H₄NHC₂H₄NH₂

Triethylene tetramine

2. ALKYL AND ARALKYL SUBSTITUTED AMMONIUM COMPOUNDS (C₂H₅)₄NOC₂H₅

Tetraethyl ammonium ethoxide (CH₃)₄NOC₄H₉

Tetramethyl ammonium butoxide

C₆H₅CH₂(C₂H₅)₃NOC₄H₉

Benzyl triethyl ammonium butoxide

C₆H₅CH₂(C₂H₅)(CH₃)₂NOC₄H₉

Benzyl dimethyl ethyl ammonium butoxide (CH₃)₄NOC₂H₅

Tetramethyl ammonium ethoxide (C₄H₉)₄NOC₄H₉

Tetrabutyl ammonium butoxide

C₆H₅CH₂(C₄H₉)₃NOC₄H₉

Benzyl tributyl ammonium butoxide

C₆H₅CH₂(C₄H₉)(C₂H₅)(CH₃)NOC₄H₉

Methylethyl butyl benzyl ammonium butoxide

HOC₂H₄NH₃OH

Monoethanol ammonium hydroxide (HOC₂H₄)₂NH₂OH

Diethanol ammonium hydroxide (HOC₂H₄)₃NHOH

Triethanol ammonium hydroxide

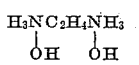

Ethylene bis ammonium hydroxide

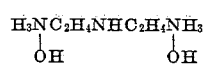

Diethylene amino bis ammonium hydroxide

Ammonia can also be used as a catalyst.

The amount of catalyst used may vary from a very small amount, say 0.05% to a quite large amount, the maximum being dependent on the physical properties desired in the final polymer. Large amounts of catalysts will increase the polymerization rate, but will, of course, remain in the polymer and thus affect the properties. The preferred range is 1 to 10% of catalyst based on the amount of cyclic compound used.

Very little is known of the mechanism of this polymerization, but it is, in the final result, the conversion of a cyclic monomer to a linear polymer, according to the equation

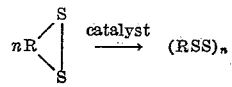

It is believed that the catalyst acts by first adding to and opening the ring by breaking the link between the sulfur atoms. The product which may be momentarily a free radical or an ion can then recombine to give the original starting material, or can react with another similar unit to give a polymer with elimination of the catalyst or its conversion to some type of terminal group. In view of the high polymeric nature of the product, it is thought that the catalyst is eliminated for the most part from the molecule.

Instead of polymerizing a single cyclic disulfide, mixtures of 2 or more of said cyclic disulfides may be polymerized to make copolymers having closely controllable properties.

One general method of making the cyclic disulfides is to first make a polyalkylene polysulfide polymer having polymeric units of the same empirical formula as that of the desired ring compound and then subject the polymer, in the form of an aqueous dispersion, to steam distillation.

For example Compounds 1 to 9 mentioned above may be made as above stated from linear polymers having the following repeating units —SCH₂CH₂OCH₂CH₂S—
—SCH₂CH₂SCH₂CH₂S—
—SCH₂CH₂OCH₂OCH₂CH₂S—
—SCH₂CH₂SCH₂SCH₂CH₂S—
—SCH₂CH₂OCH₂CH₂OCH₂CH₂S—
—SCH₂CH₂SCH₂CH₂SCH₂CH₂S—
—SCH₂CH₂CH₂CH₂CH₂S—
—SCH₂CHRCH₂S—
—SCH₂CH₂NRCH₂CH₂S—

As is well known, linear polymers having repeating polyalkylene disulfide units may be made by reacting polyalkylene polyhalides with alkaline polysulfides e. g. the polysulfides of the alkali and alkaline earth metals and ammonium. The alkaline polysulfides include the disulfides, trisulfides, tetrasulfides, pentasulfides and hexasulfides. The resulting linear polymers are composed of repeating units having the general formula

—RSS— and to the sulfur of the above shown disulfide linkage, labile or isosulfur may also be attached. Said linear polymers may also be made by oxidizing polymercaptans, as is also well known. See for example Patrick Patents 2,216,044, September 24, 1940, and 2,142,145, January 3, 1939.

A theory of the formation of the ring compounds is that during steam distillation of the chain polymers, some of the units thereof break off and form cyclic compounds by union of terminal sulfur atoms of said units. The mechanism of the ring formation is not known but is such that ring formation and elimination appears to regenerate the group so that the reaction acts in a chain mechanism and does not diminish until the polymer is substantially gone, or until a monosulfide or other non-labile group is encountered in the chain.

The following examples illustrate the above-mentioned method of making the ring compounds i. e. the cyclic disulfides.

*Example A.—Production of Compound 1*

Three mols, for example, 972 cc. of 3.09 molar Na₂S₄.₂₇ was treated with one gram of the sodium salt of butyl naphthalene sulfonic acid, eight grams of sodium hydroxide and 25 grams of MgCl₂.6H₂O all used as approximately 25 per cent solutions. This reaction mixture was heated to a temperature of 140° F. and there was added to this reaction mix 2.7 mols (386 grams) of ClC₂H₄OC₂H₄Cl. The feed period was 90 minutes during which a latex formed in the reaction. This latex was distilled with steam until 1000 cc. of distillate had been collected in order to remove all of the congeneric 1,4-thioxane formed in the reaction. After one washing the latex was treated with 4.5 mols (180 grams) sodium hydroxide for one hour at 180° F. The latex was washed free of polysulfide solution and subjected to steam distillation. The distillate in this case was cloudy with droplets of oil settling out. Decantation gave approximately 1½ grams of oil per 500 cc. of distillate but this amount could be somewhat increased by extraction with ethyl ether. Although the rate of formation of the oil, as evidenced by its rate of removal in the steam distillation, was quite slow, it continued practically unchanged for a considerable period of time, for example, about two months of distillation. If other halides are used other polymers are obtained which give different cyclic materials having different physical properties and different degrees of stability. To produce Compound 1A, proceed as above using dichloro methyl ether instead of bis B-chlorethyl ether. To produce Compound 1B proceed as above using bis (gamma chloro propyl) ether.

*Example B.—Production of Compound 2*

Proceed as in Example A except instead of 386 grams of dichloro-ethyl ether use 429 grams of $ClC_2H_4SC_2H_4Cl$ and proceed as before. To produce Compounds 2A and 2B, proceed as above using bis(chloromethyl)thioether and bis(gamma chloro propyl) thioether.

*Example C.—Production of Compound 3*

Proceed as in Example A using instead of dichloroethyl ether 467 grams of bis beta chloroethyl formal $ClC_2H_4OCH_2OC_2H_4Cl$ and proceed as before. To produce Compound 3A proceed as above using bis (chloromethyl) formal instead of bis beta chloroethyl formal. To produce 3B proceed as above using bis(gamma chloropropyl) formal.

*Example D.—Production of Compound 4*

Proceed as in Example C using equimolecular proportions of bis beta chloroethyl thioformal $$ClC_2H_4SCH_2SC_2H_4Cl$$

instead of the formal of Example C. To produce Compound 4A proceed as above using bis (chloromethyl)thioformal instead of bis beta chloroethyl thioformal. To produce 4B proceed as above using bis (gamma chloropropyl) thioformal.

*Example E.—Production of Compound 5*

Proceed as in Example A using instead of dichloroethyl ether 505 grams of triglycol dichloride $$ClC_2H_4OC_2H_4OC_2H_4Cl$$

and proceed as before. To produce Compound 5A proceed as above using bis (chloromethoxy) ethane instead of dichloro ethyl ether. To produce 5B proceed as above using bis (gamma chloropropoxy) ethane.

*Example F.—Production of Compound 6*

Proceed as in Example E using equimolecular proportions of the compound bis (beta chloroethyl thio) ethane $ClC_2H_4SC_2H_4SC_2H_4Cl$ instead of the bis (beta chloro ethoxyethane) of Example E. To produce Compound 6A proceed as above using 1,6 dichloro 2,5 dithiahexane instead of bis (beta chloro ethoxyethane). To produce 6B proceed as above using 1,10-dichloro-4,7, dithiadecane.

*Example G.—Production of Compound 7*

Proceed as in Example A using equimolecular proportions of 1,5 dichloro n-pentane instead of the dichloroether of Example A and using the same proportions of $Na_2S_{4.27}$ in the form however of a 1-molar solution in isopropanol. To produce Compound 7A proceed as above using trimethylene dichloride instead of dichloroether. To produce 7B proceed as above using heptamethylene dichloride.

*Example H.—Production of Compound 8*

Proceed as in Example A except that equimolecular proportions of 1,3 dichlor n-propane instead of the BB' dichloroethyl ether of Example 1, are used. That produces Compound 8 where R is hydrogen. To produce other compounds responding to the general formula of Compound 8 (see above) use equimolecular proportions of the substituted 1,3 dichlor n-propanes, i. e. where R is $CH_3$ and OH, respectively.

*Example I.—Production of Compound 9*

Proceed as in Example A using equimolecular proportions of bis (beta chloroethyl) amine. That produces Compound 9 where R' is hydrogen. To produce other compounds responding to the general formula of Compound 9 use equimolecular proportions of N-substituted bis (beta chloroethyl) amines where R' is an alkyl, aryl or aralkyl radical.

The yield of ring compound as obtained by distillation of washed polymer latex in some cases is quite small. This yield may be increased, in any case, by the addition of a small amount of sodium hydroxide to the latex. The quantity of sodium hydroxide or other strong hydroxides, such as potassium, required for this purpose, may vary from 0 to 25 molar per cent but is advantageously used between 5 and 10%.

All of these polymers prepared as above described, and also the polymers from other halides similarly prepared, have been found to yield these cyclic materials. In many cases extremely small quantities are found, the quantity being so small that it is necessary to extract the cyclic material from the clear distillate. However, all of the cyclic materials possess this capability of repolymerization to the polymer from which they have been prepared and this polymerization will take place spontaneously unless all traces of moisture or catalyzing influences are carefully removed. Samples which have been carefully purified in respect to moisture and catalyzing influences are capable of indefinite storage in glass.

In the above manner, polymeric $C_2H_4S_2$ yielded on steam distillation a powder in the distillate. This resulted from the cyclic material presumably originally present. If benzene is added to the distilling flask as the distillation proceeds, the distillate contains dissolved in the benzene an extremely small amount of oil possessing a strong unpleasant odor which very rapidly polymerizes to a powder resembling the original ethylene disulfide polymer. In this case it has proved up to the present time impossible to isolate any of the monomeric 4 membered dimethylene disulfide ring.

Trimethylene disulfide distills, in the procedure of Example H, at a very fast rate but polymerizes in the condenser to give a paper-like cast unless benzene is fed into the system. If benzene is fed in, as above described, there is obtained a yellow distillate which on drying is stable for a few hours. In this case the 5 membered trimethylene disulfide ring originally present polymerizes very rapidly to a paper-like polymer i. e. hard and brittle polymer. It could not be obtained free from the benzene.

2-methyl trimethylene disulfide distills, in the procedure of Example H, over at a very fast rate to give a yellow oil with slightly better stability than that of the straight trimethylene disulfide. The oil may be obtained and has a powerful unpleasant odor. It polymerizes quite rapidly to give a hard horn-like material.

2-hydroxy trimethylene disulfide distills, in the procedure of Example H, yielding the ring material at a fairly good rate as a pale yellow oil which can be isolated. Samples so far obtained have not been very stable but presumably could be stabilized if necessary by extreme desiccation. This oil polymerizes quite rapidly but in this case gives most unexpectedly a crystalline structure in the resulting polymer in spite of the fact that said polymer thus obtained is a soft wax-like material.

($C_2H_4SC_2H_4S_2$) obtained as in Example B distills easily giving a fairly good yield of a pale colored oil which when dried apparently has complete stability. It polymerizes fairly slowly if a trace of moisture is present or quite rapidly with suitable catalysts. On polymerization it gives a tough horn-like material.

($C_2H_4OC_2H_4S_2$) obtained as in Example A above distills with steam yielding an oil at a fairly good rate. This oil is pale yellow in color and, as stated before, has complete stability if dry and free of catalysts. On polymerization it yields a rubber similar to the starting polymer from which it was prepared.

($C_2H_4OC_2H_4S_4$) behaves in almost all respects the same as the corresponding disulfide polymer yielding apparently the same oil, but at a slower rate.

($C_2H_4OCH_2OC_2H_4S_2$) on steam distillation gives a distillate which is colorless and perfectly clear. From this solution by ether extraction there is obtainable a very pale yellow oil which if dry has good stability and which may be polymerized with water or other catalysts to a rubber. This ability to polymerize in the presence of water is very nicely demonstrated by this material since if the distillate is allowed to stand over-night it becomes milky and the polymer will settle out as a skin or powder in the bottom of the flask.

($C_2H_4OC_2H_4OC_2H_4S_2$) likewise distills to give a clear solution in the distillate. On standing it likewise will deposit a small amount of polymer. If, however, the solution is extracted with ether shortly after distillation there is obtained then an extremely small amount of an oil with a slight color. This oil apparently crystallizes at a temperature only slightly below room temperature and its condition as an oil or solid is dependent on the temperature.

The above represents a number of examples of materials of this type obtained by this method. All of the polysulfide polymers so far distilled have given varying amounts of similar compounds in the distillate, the yield in some cases being only a few hundredths of a per cent.

It has been found that the rate of formation of the monomeric disulfides is faster when dry distillation is used instead of steam distillation. An example of dry distillation is as follows:

*Example K*

A poly thio polymercaptan prepared in accordance with U. S. Patent 2,466,963, issued April 12, 1949 to Patrick et al., and having a molecular weight of about 2000 to 25,000 is mixed with 5 to 75 per cent by weight of a caustic alkali e. g. KOH or NaOH. The mixture is heated at pressure of about 0.1 mm. to 20.0 mm. and temperatures of 50° C. to 500° C. until the distillation of the monomeric disulfide slows to an appreciable rate. In an illustrative example i. e. where the polymeric unit is —$SC_2H_4OC_2H_4S$— the yield of corresponding monomeric disulfide was 51 per cent by weight in about two hours of distillation as compared with about one month to obtain the same yield by steam distillation.

Polysulfide polymers in general can be thus treated i. e. polysulfide polymers comprising recurring units selected from the group consisting of —SRS— and R'(S—)$_x$ where S is a sulfur atom, R is a radical having a sulfur-connected valence of two and R' is a radical having a sulfur connected valence equal to $x$ where $x$ is a whole number greater than two, said radicals being selected from the groups consisting of

designating a single carbon atom

designating two adjacent carbon atoms and

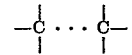

designating two carbon atoms joined to and separated by intervening structure.

This application is a division of my copending application Serial No. 240,067, filed August 2, 1952, now Patent No. 2,657,198.

What is claimed is:

1. Process of making a cyclic monomeric disulfide having the general formula

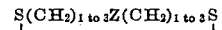

where Z is a member of the group consisting of O, S, $OCH_2O$—, —$SCH_2S$—, $OC_2H_4O$—, —$SC_2H_4S$—, and —$CH_2$, in which a product consisting essentially of an aqueous dispersion of a polymeric polyalkylene polysulfide having recurring units of the formula —$S(CH_2)_{1\ to\ 3}Z(CH_2)_{1\ to\ 3}S$— is subjected to steam distillation under alkaline conditions, the alkaline material being of the group consisting of alkali and alkaline earth hydroxides, obtaining a distillate and separating said monomeric disulfide from the distillate.

2. Process of making a cyclic monomeric disulfide having the general formula

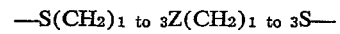

where Z is a member of the group consisting of O, S, —$OCH_2O$—, —$SCH_2S$—, $OC_2H_4O$—, —$SC_2H_4S$—, and —$CH_2$—, which comprises subjecting to dry distillation a mixture of a polysulfide polymer and about 5 to 75 per cent by weight of a caustic alkali at pressures of about 0.1 mm. to 20.0 mm. and temperatures of about 50° C. to 500° C. until the distillation of the monomeric disulfide slows to an inappreciable rate, said polysulfide polymer comprising recurring units selected from the group consisting of —SRS— and R'(S—)$_x$ where S is a sulfur atom, R is a radical having a sulfur-connected valence of two and R' is a radical having a sulfur-connected valence equal to $x$ where $x$ is a whole number greater than two, said radicals being selected from the groups consisting of

designating a single carbon atom,

designating two adjacent carbon atoms and

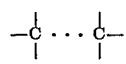

designating two carbon atoms joined to and separated by intervening structure, obtaining a distillate and separating said monomeric disulfide from the distillate.

References Cited in the file of this patent

UNITED STATES PATENTS

| | | |
|---|---|---|
| 2,067,465 | Ter Horst | Jan. 12, 1937 |
| 2,102,564 | Bonstein | Dec. 14, 1937 |

OTHER REFERENCES

Patrick, Trans. Faraday Soc. 32 (1936), pp. 347–58.